United States Patent [19]

Takezawa

[11] Patent Number: 5,146,598
[45] Date of Patent: Sep. 8, 1992

[54] COMMUNICATION TERMINAL APPARATUS HAVING AN INTERRUPT/RESTART FUNCTION WITH TIME MEASURING CONTROL FOR INTERRUPTION AND DISABLING FEATURE

[75] Inventor: Katsuhito Takezawa, Kawasaki, Japan

[73] Assignee: Canon Kabushiki Kaisha, Tokyo, Japan

[21] Appl. No.: 450,512

[22] Filed: Dec. 14, 1989

[30] Foreign Application Priority Data

Dec. 27, 1988 [JP] Japan ................................ 63-327659

[51] Int. Cl.⁵ .............................................. G06F 13/38
[52] U.S. Cl. .................................. 395/725; 395/325; 395/275; 364/242; 364/242.94; 364/260.1; 364/284.4
[58] Field of Search ... 364/200 MS File, 900 MS File; 395/275, 725, 325, 550

[56] References Cited

U.S. PATENT DOCUMENTS 3,810,120  5/1974  Huettner et al. ............... 395/275
4,456,956  6/1984  El-Gohary et al. ............. 395/200
4,570,217  2/1986  Allen ........................... 364/188

Primary Examiner—Lawrence E. Anderson
Attorney, Agent, or Firm—Fitzpatrick, Cella, Harper & Scinto

[57] ABSTRACT

When a no-communication state is detected for a predetermined time of time during communication in response to an interrupt designation to or from an apparatus on the other end of the line, an operation of a time monitoring timer for terminating the communication is interrupted. The time monitoring timer is restarted in response to a restart designation. Therefore, communication can be continued without interrupting an interrupt/restart service provided by, e.g., an ISDN due to a time-out error. When a trouble which disables communication occurs during communication, an interrupt service is requested to a network. When the trouble which disables communication is recovered, a restart service can be requested to the network. In this case, communication can be normally restarted without being accidentally terminated intermediately.

8 Claims, 4 Drawing Sheets

COMMUNICATION TERMINAL APPARATUS HAVING AN INTERRUPT/RESTART FUNCTION WITH TIME MEASURING CONTROL FOR INTERRUPTION AND DISABLING FEATURE

BACKGROUND OF THE INVENTION

1. Field of the Invention

The present invention relates to a communication terminal apparatus connected to an exchange network having an interrupt/restart function, e.g., an ISDN (Integrated Services Digital Network).

2. Description of the Prior Art

In a conventional communication terminal apparatus such as a facsimile apparatus connected to an ISDN, when a scanner, a printer or the like connected (as a connected local device) to the apparatus causes a trouble which disables data communication, e.g., a paper jam, out of paper, or the like, this results in a communication disabled state. In this case, the apparatus sends a communication interrupt designation command to the network (i.e., to an apparatus on the other end of the line). When the trouble is recovered, the apparatus outputs a communication restart designation command to restart communication with the apparatus on the other end of the line. When a communication termination apparatus is moved along one subscriber line during communication, a communication interrupt designation command is sent to the network, and a restart designation command is sent at a destination of movement, so that the terminal apparatus can be moved and communication can be restarted without disconnecting a line.

When a communication apparatus on the other end of the line receives the communication interrupt designation command from the apparatus which caused the trouble or the apparatus which is to be moved, it interrupts communication, and restarts communication when the trouble is recovered or the movement is completed, and the communication restart designation command is received.

However, when the communication terminal apparatus outputs or receives the interrupt/restart designation command, a communication monitoring timer for monitoring an accumulation communication time with the network is kept operated, and the communication monitoring timer continuously accumulates a time between the interrupt and restart designation commands. In this case, there is no problem when the restart designation command is issued soon. However, when a long time interval elapses before the restart designation command is issued, the communication monitoring timer causes a time-out error, and communication is undesirably stopped although communication processing is normally performed.

At this time, it is determined that communication is abnormally ended, resulting in intermediate termination.

Alternatively, the apparatus may immediately stop communication upon reception of the interrupt designation command without monitoring time at the communication monitoring timer.

In the prior art, when a trouble occurs in the connected local device of the communication apparatus, communication is stopped in the middle of communication, resulting in omission of received documents. Even when the trouble of the local device is recovered, extra processing such as re-connection and re-transmission processing must be performed.

SUMMARY OF THE INVENTION

It is an object of the present invention to solve the above-mentioned problem.

It is another object of the present invention to provide a communication terminal apparatus which is free from intermediate termination of communication and omission of received documents even when a local device connected to a communication apparatus on the other end of the line causes a trouble, and does not require extra processing, e.g., re-connection and re-transmission processing when the trouble of the local device is recovered.

It is still another object of the present invention to provide a communication terminal apparatus which can prevent intermediate termination of communication by interrupting/restarting a communication monitoring timer in synchronism with an interrupt/restart designation command sent from an ISDN.

It is still another object of the present invention to provide a communication terminal apparatus which can prevent intermediate termination of communication by interrupting/restarting a communication monitoring timer in synchronism with an interrupt/restart designation command sent to an ISDN.

As a means for achieving the above objects, the communication terminal apparatus comprises the following arrangement.

That is, the communication terminal apparatus of the present invention comprises communication intermediate termination means for terminating corresponding communication upon detection of a no-communication state for a predetermined period of time, interrupt designation detection means for detecting an interrupt designation from the network during communication, and time monitoring interrupt means for, when the interrupt designation detection means detects an interrupt designation from the network, interrupting a time monitoring operation by the communication intermediate termination means.

In addition to the above arrangement, the apparatus further comprises restart designation detection means for detecting a restart designation from the network, and time monitoring restart means for, when the restart designation detection means detects the restart designation from the network, restarting the time monitoring operation of the communication intermediate termination means interrupted by the time monitoring interrupt means.

There is also provided a communication terminal apparatus connected to a network having an interrupt/restart function, comprising communication intermediate termination means for terminating corresponding communication upon detection of a no-communication state for a predetermined period of time, interrupt designation detection means for detecting an interrupt designation to the network, and time monitoring interrupt means for, when the interrupt designation detection means detects an interrupt designation to the network, interrupting a time monitoring operation by the communication intermediate termination means.

In addition to the above arrangement, the apparatus further comprises restart designation detection means for detecting a restart designation to the network, and time monitoring restart means for, when the restart designation detection means detects the restart designation to the network, restarting the time monitoring operation of the communication intermediate termination means interrupted by the time monitoring interrupt means.

In the above arrangement, a communication monitoring timer is interrupted in response to an interrupt designation command to or from a network, and is restarted in response to a restart instruction. Therefore, communication can be continued without interrupting an interrupt/restart service provided by, e.g., an ISDN due to a time-out error.

Thus, when a trouble which disables communication occurs during communication, or when a terminal is moved along a single subscriber line, an interrupt service is requested to the network. When the trouble which disables communication is recovered or when movement of the terminal is completed, a restart service can be requested. In this case, communication can be prevented from being accidentally terminated in the middle of communication, and can be normally restarted.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment according to the present invention will be described in detail below with reference to the accompanying drawings.

Figure 1:
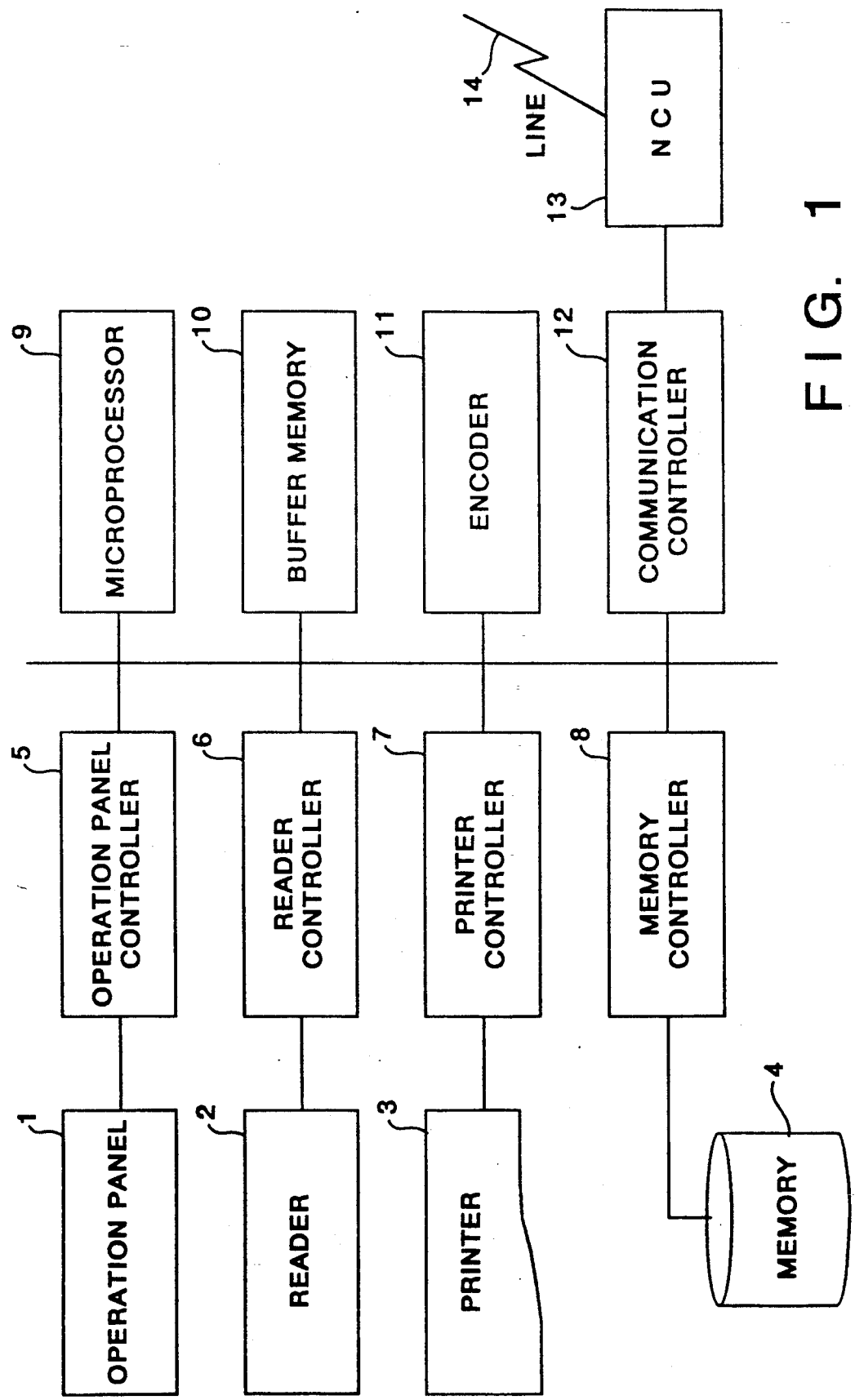
FIG. 1 is a block diagram showing an embodiment according to the present invention.

FIG. 1 is a block diagram showing an embodiment of the present invention. In this embodiment, the present invention is applied to a facsimile apparatus as a communication terminal apparatus.

In FIG. 1, reference numeral 1 denotes an operation panel for inputting various inputs of this apparatus; 2, a reader for reading an original to be transmitted; and 3, a printer for printing out received data. In this embodiment, the printer 3 comprises a laser beam printer (to be referred to as an LBP hereinafter). However, this printer may comprise a printer of any other type, e.g., a thermal transfer printer. Reference numeral 4 denotes a memory for storing programs shown in FIGS. 3A and 3B (to be described later), transmission/reception data, and the like. The memory 4 comprises a nonvolatile memory such as a hard disk. Reference numeral 5 denotes an operation panel controller for controlling the operation panel 1; 6, a reader controller for controlling the reader 2; 7, a printer controller for controlling the printer 3; 8, a memory controller for controlling the memory 4; and 9, a microprocessor for controlling the entire apparatus of this embodiment according to the programs stored in the memory 4. The programs may be stored not in the memory 4 but in a program ROM incorporated in the microprocessor 9. Reference numeral 10 denotes a buffer memory for storing image data; 11, an encoder for compressing/expanding data; 12, a communication controller; 13, a network control unit (to be referred to as an NCU hereinafter); and 14, an ISDN connected to the apparatus of this embodiment.

Figure 2:
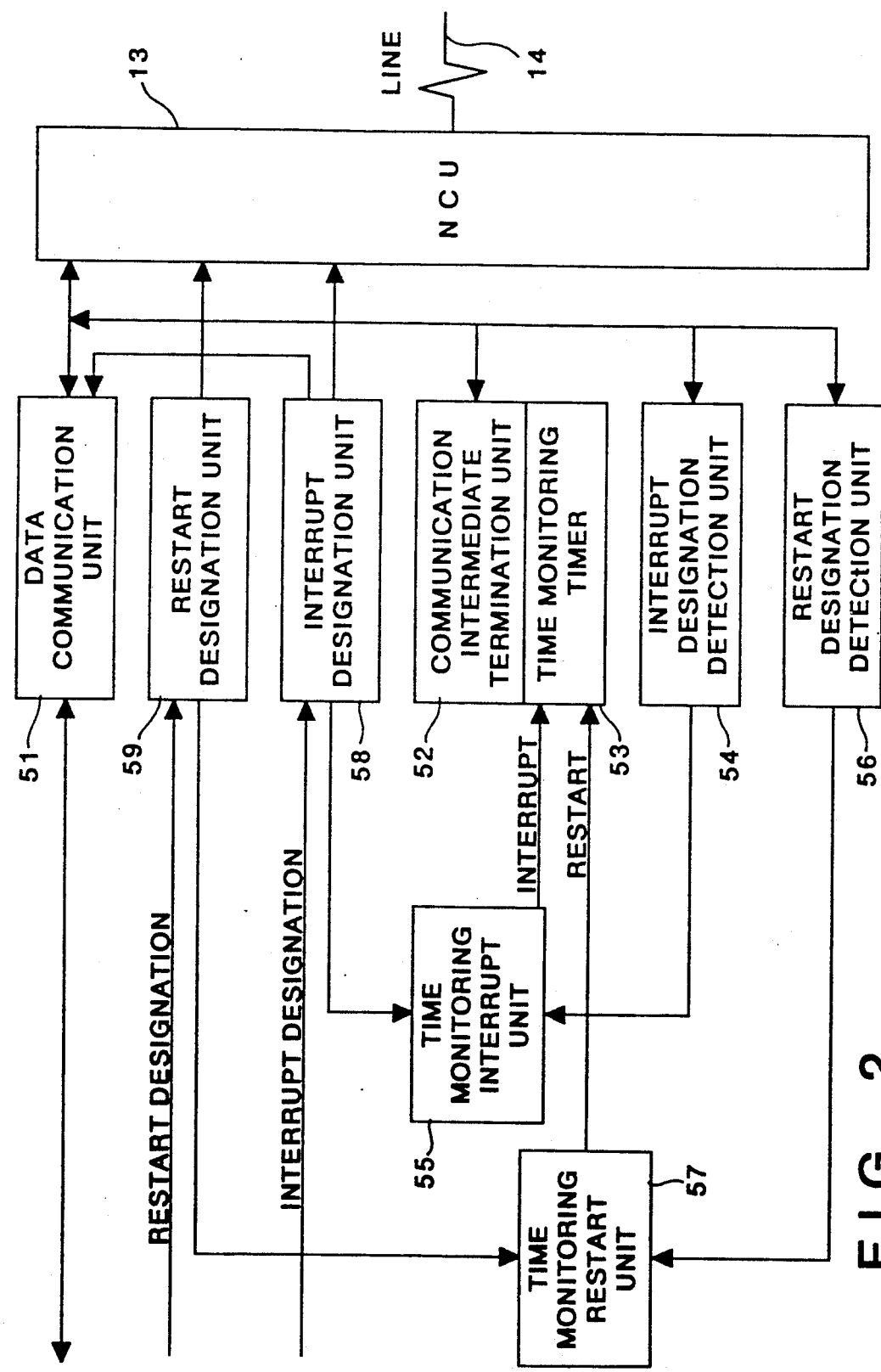
FIG. 2 is a block diagram showing an embodiment of a communication control function under the program control by a communication controller and a microprocessor of this embodiment.

FIG. 2 shows an embodiment of a communication control function under the program control by the communication controller 12 and the microprocessor 9 of this embodiment.

In FIG. 2, reference numeral 51 denotes a data communication unit for performing various known facsimile data communications; 52, a communication intermediate termination unit for, when no communication is detected for a predetermined period of time during communication, terminating the communication; 53, a time monitoring timer for measuring a no-communication time during communication in the communication intermediate termination unit 52; 54, an interrupt designation detection unit for detecting an interrupt designation command sent from an apparatus on the other end of the line through the network, the line 14, and the NCU 13 during communication; 55, a time monitoring interrupt unit for, when the interrupt designation detection unit 54 detects the interrupt designation command from the apparatus on the other end of the line or when an interrupt designation unit 58 detects an interrupt designation command to the apparatus on the other end of the line, interrupting a time measuring operation of the time monitoring timer 53 in the communication intermediate termination unit 52; 56, a restart designation detection unit for detecting a restart designation command sent from the apparatus on the other end of the line through the network, the line 14, and the NCU 13; and 57, a time monitoring restart unit for, when the restart designation detection unit 56 detects the restart designation command from the apparatus on the other end of the line or when a restart designation unit 59 detects a restart designation command to the apparatus on the other end of the line, restarting a communication time monitoring operation (time measuring operation) of the time monitoring timer 53, which has been interrupted by the time monitoring interrupt unit 55.

Reference numeral 58 denotes the interrupt designation unit for, when a communication interrupt factor for the network occurs due to a paper jam at the reader 2 or an out-of-paper state of the printer 3, detecting the interrupt designation command addressed to the apparatus on the other end of the line, which is output to the NCU 13 and the line 14 through the data communication unit 51; and 59, the restart designation unit for, when the communication interrupt factor for the network is eliminated, detecting a communication restart designation command addressed to the apparatus on the other end of the line, which is output to the NCU 13 and the line 14 through the data communication unit 51.

In the above arrangement, the operation of the time monitoring timer 53 is interrupted in response to the interrupt designation command to or from the apparatus on the other end of the line, and is restarted in response to the restart designation command. Thus, communication can be continued without interrupting an interrupt/restart service provided by the ISDN due to a time-out error or the like.

When a trouble which disables communication occurs during communication, an interrupt service is requested to the network, and when the trouble which disables the communication is recovered, a restart service can be requested to the network. In this case, communication can be prevented from being accidentally terminated in the middle of it, and can be normally restarted.

The above components may be realized in a software or hardware manner. In this embodiment, most of components are essentially realized by the program control of the microprocessor 9. For this reason, in the following description, the operations of the respective components will not be specifically described in detail below. However, the corresponding components shown in FIG. 2 function during the following operations, as a matter of course.

Figure 3A:
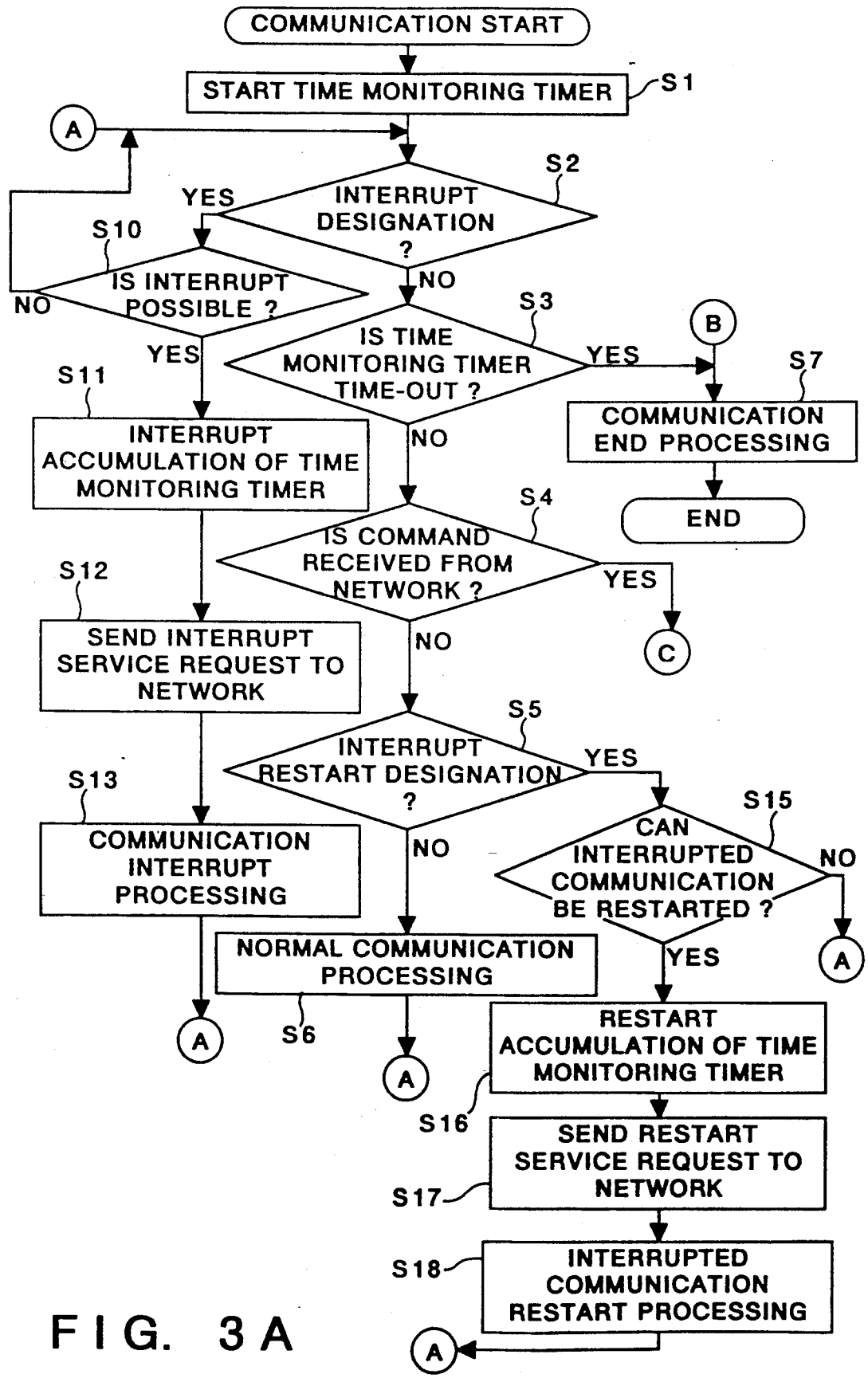
FIGS. 3A and 3B are flow charts showing a communication operation of this embodiment.
Figure 3B:
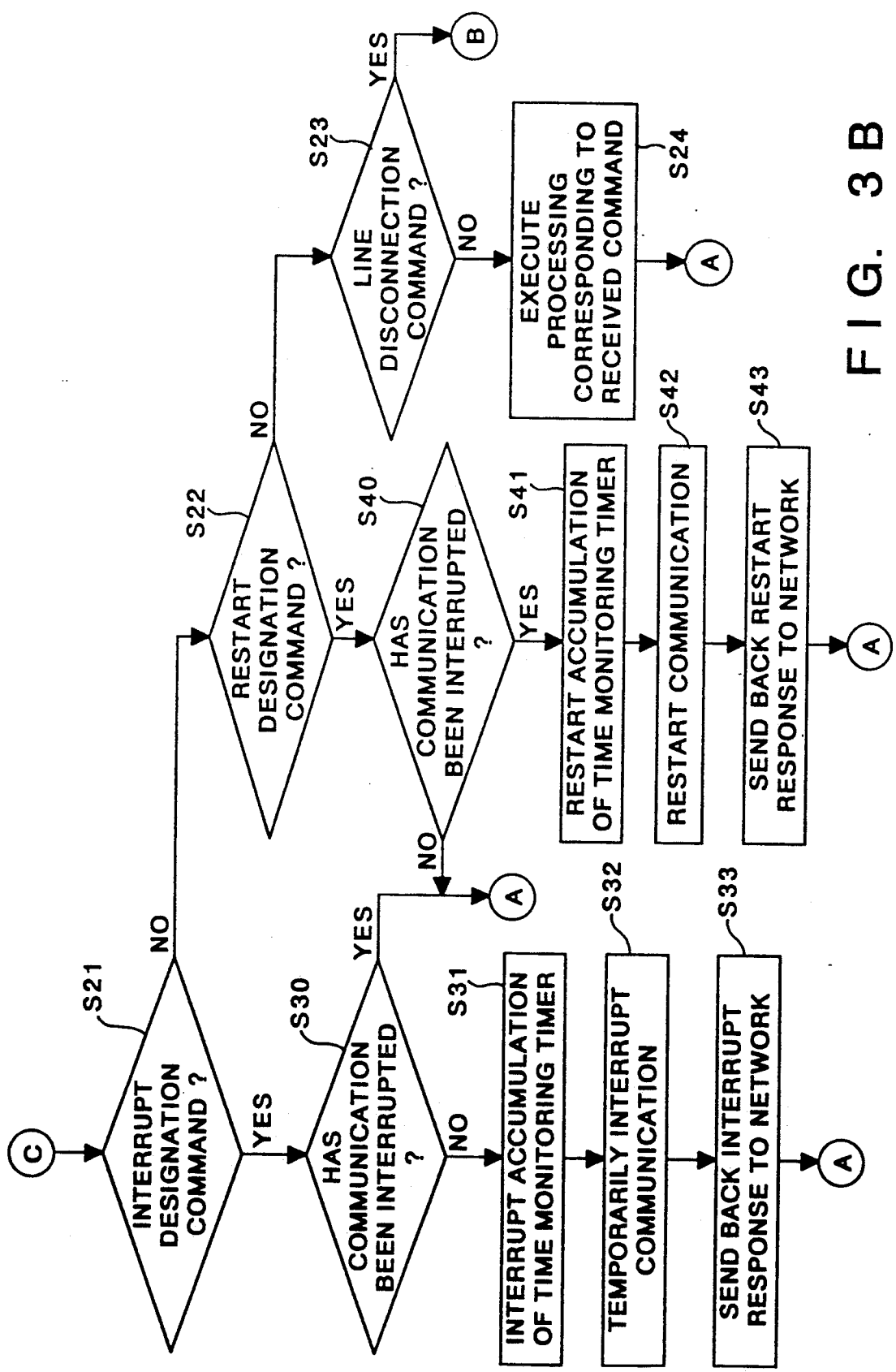

The communication operation of this embodiment with the above arrangement will be described below with reference to the flow charts of FIGS. 3A and 3B.

When a communication processing request at the ISDN is issued, the communication controller 12 is enabled, and controls the NCU 13 to set a communication path with a desired apparatus on the other end of the line. Thus, a communication enable state between the two apparatuses is set. The control then enters processing shown in FIGS. 3A and 3B.

In step S1, a desired communication time is set in the time monitoring timer 53, and the timer is started. When the communication controller 12 (e.g., the data communication unit 51) starts facsimile communication, the flow advances to step S2 to check whether or not an interrupt designation command is issued by a user or other events (e.g., when a trouble occurs in a connected local device). If NO in step S2, it is checked in step S3 if the time monitoring timer 53 causes a time-out error. If NO in step S3, the flow advances to step S4 to check whether or not a control command (service request) is sent from the network. If NO in step S4, it is checked in step S5 if an interrupt or restart designation command is generated. If NO in step S5, the flow advances to step S6, and normal communication processing in a predetermined unit, e.g., data transmission or reception processing is executed. The flow then returns to step S2.

When data or control command transmission/reception is stopped for a predetermined period of time during communication, the time monitoring timer 53 causes a time-out error. In this case, it is determined that the apparatus causes some trouble, and the flow advances from step S3 to step S7. In step S7, communication end processing is performed to maintain communication efficiency of the network, thus ending communication.

When the interrupt designation command is generated due to a trouble in the connected local device and the interrupt designation command to the apparatus on the other end of the line is detected, the flow advances from step S2 to step S10. It is checked in step S10 if communication is being interrupted at the present time or cannot be interrupted at the present time due to other causes. If it is determined in step S10 that communication is being interrupted or cannot be interrupted, the interrupt designation command is invalidated, and the flow returns to step S2.

If it is determined in step S10 that communication can be interrupted, the flow advances to step S11, and accumulation of the count value of the time monitoring timer 53 is interrupted (by the interrupt designation unit 58 and the time monitoring interrupt unit 55 in FIG. 2). In step S12, a communication interrupt service request is issued to the network to request interruption of communication. In step S13, temporary interrupt processing of processing which is being subjected to communication is performed, and the flow returns to step S2.

When communication is interrupted in this manner, if an interrupt event is eliminated or when a user issues a communication restart instruction, the flow advances from step S5 to step S15. It is then checked in step S15 if communication is being performed at the present time or the interrupted communication cannot be restarted at the present time due to non-connection of the line or other causes. If NO in step S15, the interrupt designation command is invalidated, and the flow returns to step S2.

If YES in step S15, the flow advances to step S16, and accumulation of the count of the time monitoring timer 53 is restarted (by the restart designation unit 59 and the time monitoring restart unit 57 in FIG. 2). In step S17, a communication restart service request is sent to the network to request restart of communication. In step S18, restart processing of the communication which is being interrupted is executed, and the flow then returns to step S2.

When a control command is sent from the network, the flow advances from step S4 to the processing in step S21 and thereafter. In steps S21 to S23, it is checked if sent data is the "interrupt designation", "restart designation", or "line disconnection" command. If NO in steps S21 to S23, the flow advances from step S23 to step S24, and processing corresponding to the received command is executed. The flow then returns to step S2.

If the data sent from the network is the "line disconnection" command, the flow advances from step S23 to step S7, and communication end processing is executed, thus ending processing.

If the data sent from the network is the "interrupt designation" command, the flow advances from step S21 to step S30 to check if the communication is being interrupted at the present time. If YES in step S30, the received command is ignored, and the flow returns to step S2.

If NO in step S30, the flow advances to step S31. In step S31, and accumulation of the count of the time monitoring timer 53 is interrupted (by the interrupt designation detection unit 54 and the time monitoring interrupt unit 55 in FIG. 2). In step S32, temporary interrupt processing of processing which is being subjected to communication is executed in step S32. In step S33, a communication interrupt response is sent back to the network.

If the data sent from the network is the "restart designation" command, the flow advances from step S22 to step S40 to check if communication is being interrupted. If NO in step S40, the input command is ignored, and the flow returns to step S2.

If YES in step S40, the flow advances to step S41, and accumulation of the count of the time monitoring timer 53 is restarted (by the restart designation detection unit 56 and the time monitoring restart unit 57 in FIG. 2). In step S42, restart processing of the interrupted communication is performed in step S42. In step S43, a communication restart response is sent to the network, and the flow returns to step S2 to restart the interrupted communication.

In the above description, only the transmission-side apparatus transmits the "communication interrupt" command, and the like. However, the reception-side apparatus may send the "communication interrupt" command, and the same processing as described above may be executed with the transmission-side apparatus.

Under the above-mentioned control, when processing of the "communication interrupt" command is performed by one communication apparatus which is being subjected to communication, accumulation of the time monitoring timer 53 is stopped during interruption of the processing. Thus, communication can be continued without interrupting an interrupt/restart service provided by the ISDN due to a time-out error or the like.

When a trouble which disables communication occurs during communication, or when a terminal is moved along a single subscriber line, an interrupt service is requested to the network. When the trouble which disables communication is recovered, or when movement of the terminal is completed, a restart service is requested. Thus, even when a trouble occurs, communication can always be normally ended without being intermediately terminated.

In the above description, the present invention is applied to a facsimile apparatus as the communication terminal apparatus. However, the present invention can be applied to any types of communication apparatus as long as they can perform communication with an ISDN.

As described above, according to the present invention, when an interrupt event occurs, an interrupt request is sent to the network, and measurement of time by the time monitoring timer is interrupted. Thus, communication can be normally restarted without causing a time-out error of a communication monitoring time during interruption.

The time monitoring timer which interrupts measurement of time is restarted in response to the communication restart designation command, and the restart request is sent to the network. Therefore, monitoring of the communication time can be restarted upon restart of the interrupted communication.

Furthermore, when the communication interrupt designation command is sent from the network, measurement of time by the time monitoring timer is interrupted. Therefore, communication can be restarted without causing a time-out error of a communication monitoring time during interruption. Since the time monitoring timer which interrupts measurement of time is restarted in response to the communication restart designation command from the network, monitoring of the communication time can be restarted upon restart of the interrupted communication. For this reason, when a trouble which disables communication occurs during communication, or when a terminal is moved along a single subscriber line, the interrupt service is requested to the network. When the trouble which disables communication is recovered, or when movement of the terminal is completed, the restart service is requested to the network. Thus, even when such a trouble occurs, communication can always be normally ended without being intermediately terminated.

Moreover, in the above arrangement, not only communication but also the time monitoring timer of the terminal apparatus are interrupted in response to the interrupt designation command from the network, and not only communication but also the time monitoring timer are restarted in response to the restart designation command. Therefore, communication can be continued without interrupting the interrupt/restart service provided by an ISDN or the like due to a time-out error in a facsimile apparatus. As a result, even when a local device connected to the communication apparatus on the other end of the line causes a trouble, a communication terminal apparatus of the present invention is free from intermediate termination of communication and omission of received documents, and does not require extra processing such as re-connection and re-transmission processing after the trouble of the local device is removed.

As many apparently widely different embodiments of the present invention can be made without departing from the spirit and scope thereof, it is to be understood that the invention is not limited to the specific embodiments thereof except as defined in the appended claims.

What is claimed is:

1. A communication terminal apparatus connected to an integrated services digital network (ISDN) having an interrupt/restart function, comprising:

communication means for performing data communication with a communication apparatus on another end of a line via the ISDN;

time measuring means for measuring a time period during which said communication means is initially interrupted to communicate with the communicate apparatus on the other end;

communication termination means for terminating the communication of said communication means with the communication apparatus on the other end when the time period measured by said time measuring means reaches a predetermined value;

interrupt command detection means for detecting a subsequent communication interrupt command from the ISDN while the communication between said communication means and the communication apparatus on the other end is interrupted; and control means for controlling said time measuring means to stop its time measuring operation in order to disable said communication termination means when said interrupt command detection means detects a subsequent communication interrupt command from the ISDN.

2. The apparatus according to claim 1, wherein when communication is not interrupted in accordance with an operation state of said communication apparatus, said control means inhibits said time measuring means from stopping the time measuring operation.

3. The apparatus according to claim 1, further comprising:

restart command detection means for detecting a communication restart command from the LSDN, wherein said control means controls said time measuring means to restart the time measuring operation when said restart command detection means detects a communication restart command from the ISDN.

4. The apparatus according to claim 3, wherein when communication is not restarted in accordance with an operation state of said communication apparatus, said control means inhibits said time measuring means from restarting the time measuring operation.

5. A communication terminal apparatus connected to an integrated services digital network (ISDN) having an interrupt/restart function, comprising:

communication means for performing data communication with a communication apparatus on another end of a line via the ISDN;

time measuring means for measuring a time period during which said communication means is initially interrupted to communicate with the communication apparatus on the other end;

communication termination means for terminating the communication of said communication means with the communication apparatus on the other end when the time period measured by said time measuring means reaches a predetermined value;

interrupt command detection means for detecting a subsequent communication interrupt command to be sent to the ISDN during the interruption of the communication with the communication apparatus on the other end; and control means for controlling said time measuring means to stop its time measuring operation in order to disable said communication termination means when said interrupt command detection means detects a subsequent communication interrupt command to be sent to the ISDN.

6. The apparatus according to claim 5, wherein when communication is not interrupted in accordance with an operation state of said communication apparatus, said control means inhibits said time measuring means from stopping the time measuring operation.

7. The apparatus according to claim 5, further comprising:

restart command detection means for detecting a communication restart command to be sent to said ISDN, wherein said control means controls said time measuring means to restart the time measuring operation when said restart command detection mean detects a communication restart command to be sent to the ISDN.

8. The apparatus according to claim 7, wherein the communication is not restarted in accordance with an operation state of said communication apparatus, said control means inhibits said time measuring means from restarting the time measuring operation.

* * * * *

UNITED STATES PATENT AND TRADEMARK OFFICE
CERTIFICATE OF CORRECTION

PATENT NO. : 5,146,598
DATED : September 8, 1992
INVENTOR(S) : KATSUHITO TAKEZAWA It is certified that error appears in the above-identified patent and that said Letters Patent is hereby corrected as shown below:

IN [57] ABSTRACT

Line 2, "time of time" should read --period of time--.

COLUMN 6

Line 45, "of processing" should read --of data--.
Line 59, "in step S42" should be deleted.

COLUMN 8

Line 48, "LSDN," should read --ISDN,--.

COLUMN 10

Line 10, "mean" should read --means--.
Line 14, "wherein the" should read --wherein when--.

Signed and Sealed this

Sixteenth Day of November, 1993

Attest:

BRUCE LEHMAN

Attesting Officer    Commissioner of Patents and Trademarks